United States Patent [19]

Zeller

[11] Patent Number: 5,205,654
[45] Date of Patent: Apr. 27, 1993

[54] AUTOMATIC DELIVERY DEVICE FOR LUBRICATING A BEARING

[75] Inventor: Werner Zeller, Weiz, Austria

[73] Assignee: Elin Energieversorgung GmbH, Vienna, Austria

[21] Appl. No.: 773,959

[22] PCT Filed: May 11, 1990

[86] PCT No.: PCT/AT90/00045

§ 371 Date: Nov. 15, 1991

§ 102(e) Date: Nov. 15, 1991

[87] PCT Pub. No.: WO90/14523

PCT Pub. Date: Nov. 29, 1990

[30] Foreign Application Priority Data

May 18, 1989 [AT] Austria .................................. 1194/89

[51] Int. Cl.⁵ .............................................. F16C 33/10
[52] U.S. Cl. ...................................... 384/404; 384/414; 384/472
[58] Field of Search ............... 384/368, 369, 397, 403, 384/404, 414, 472

[56] References Cited

U.S. PATENT DOCUMENTS

| | | | |
|---|---|---|---|
| 2,651,553 | 9/1953 | Simonis et al. | 384/404 |
| 2,884,284 | 4/1959 | Bohn | 384/404 |
| 3,549,222 | 12/1970 | Hansen et al. | |
| 3,635,578 | 1/1972 | Wagner | 384/404 X |
| 4,448,552 | 5/1984 | White et al. | 384/404 |
| 4,605,101 | 8/1986 | Barbeau | |
| 4,643,593 | 2/1987 | Gaffal et al. | 384/404 X |
| 4,964,740 | 10/1990 | Nakano et al. | 384/404 X |

FOREIGN PATENT DOCUMENTS 3343593 6/1985 Fed. Rep. of Germany .
1238199 7/1971 United Kingdom .

Primary Examiner—Thomas R. Hannon
Attorney, Agent, or Firm—Sandler Greenblum & Bernstein

[57] ABSTRACT

A side channel pump is disposed on the same shaft as a combination friction bearing, each conveyor blade having a cutout at the height of the side channel equivalent to and corresponding with the cross section of the side channel.

10 Claims, 1 Drawing Sheet

AUTOMATIC DELIVERY DEVICE FOR LUBRICATING A BEARING

BACKGROUND OF THE INVENTION

1. Field of the Invention

The invention is related to an automatic delivery device for lubricating a bearing, comprising an oil inlet and an oil outlet opening as well as a side channel pump with preferably planar delivery blades.

2. Description of Background and Material Information

A great number of different systems are available for lubricating machine bearings. A method often used for bearing lubrication of large machines is low pressure circulation lubrication. In this connection, oil is conveyed by means of a pump from an oil tank into an elevated reservoir, with the interposition of a cooling device and a filter (or cooling and filtering unit). From there the oil flows to the bearings to be lubricated under the force of gravity. This type of lubrication is very efficient and also economical, because the circulating oil is run through a filter and therefore can be used over again for some time.

This system has nevertheless several disadvantages which have proven to be very serious, in particular in connection with installations of great importance.

In connection with important installations in which the mentioned system is used, two oil pumps are customarily provided so as to be able to switch to the other pump if one of them should fail. To increase reliability further, it is possible to supply each one of these pumps from a different electrical system. Normally, one of these pumps is driven by an AC motor, the other with a DC motor, the DC current mostly being drawn from a battery-equipped emergency supply system. There obviously is a danger of both electrical systems failing or both motors or both pumps becoming damaged within a short period of time. In such cases the machine to be lubricated must naturally be shut down. Even with an appropriate optimal layout of the elevated reservoir, oil supply will only be available for a short time, usual times being approximately five to ten minutes.

A further disadvantage consists in that first the elevated reservoir must be filled with oil before the machine to be lubricated can be permitted to be started. In connection with some bearing designs, starting of the machine is also delayed because the bearings first must be filled with oil.

Not only is the elevated reservoir placed higher than the machine to be lubricated, often it is housed in another room located above it. In practice, difficulties often arise from the discrepancy between the space required and the space actually available. A further weak point often is constituted by the three pipes leading to the elevated reservoir, i.e., the supply, run-off and relief pipes. Not only do they often require valuable space, but quite often it is very difficult to lay them without creating dead corners and zones of heating.

A low-cost self-contained lubricating system for a bearing of a turbine shaft seated in the support housing is presented in U.S. Pat. No. 4,605,101, issued on Aug. 12, 1986. This lubricating system consists of a first seal arrangement between the shaft and housing, positioned at an axial distance from one side of the bearing arrangement, and a second seal arrangement between the shaft and housing, positioned at an axial distance from the other side of the bearing arrangement. The bearing arrangement is embodied in such a way that an oil sump chamber which contains the lubricant is created in the support housing. Each bearing arrangement contains an elastic O-ring between the shaft and the support housing as well as two impeller wheels which are connected inside the oil sump chamber with the shaft and pump the lubricant from the oil sump chamber through the bearing arrangement and back to the oil sump chamber during the rotation of the shaft.

Even though the lubricating system proposed in U.S. Pat. No. 4,605,101 is of low cost, it has the disadvantage that the lubricant must often be renewed, which requires interruptions of the operation.

In United Kingdom Patent No. 1,238,199, published on Jul. 7, 1971, a roller bearing arrangement is described, which includes in particular a fast-moving shaft roller bearing. A roller bearing is used having an inner and an outer bearing race as well as a roller cage with associated rollers. In accordance with the main claim of the aforementioned United Kingdom patent, means are provided which become effective with the rotation of the bearing and cause hydraulic coupling of the roller cage. In accordance with the dependent claims of the aforementioned United Kingdom patent, several such means are proposed, oil or an oil-air mixture being cited in one of the claims. The bearing is definitely rigidly mounted on the shaft in this case, where the medium transferring the torque from the shaft to the roller cage is a lubricating oil or an oil-air mixture. This lubricating and transmission medium is transported to the bearing cage through conduits in the shaft and the inner bearing race. Oil outlet conduits are provided on both sides in the outer bearing race. By means of this, the lubricating and transmission medium can run off without delaying the roller movement.

The purpose of the invention in United Kingdom Pat. No. 1,238,199 is not primarily lubrication of a bearing, but the improvement of the kinematic running conditions of the rollers when the shaft is pre-stressed. The disadvantage is that with heavy, jerky operation, the constant lubrication of the rollers is not assured.

German Published Patent Application No. 3,343,593, published on Jun. 13, 1985, deals with the lubrication of a rolling bearing of large diameter. Its definite purpose is the improvement of the known lubrication system of fastturning roller bearings, the balls or rollers of which do not come in contact with an oil bath and are therefore lubricated by means of whirling upwards. It is proposed in the aforementioned German publication to embody the portion of the whirling disks which dips into the oil bath and is fixedly connected with the rotating portion of the bearing in the form of an axially extending collar. The whirling disk is closely surrounded by a chamber which is open to the top in the direction of the roller bearing. The oil film is pushed in the direction of the roller bearing in this area.

The disadvantage of the invention of the aforementioned German publication lies in that the constant supply of amounts of oil to the bearing cannot be assured, because of which operational disruptions can occur in machines with extremely high rpm.

SUMMARY OF THE INVENTION

It is therefore an object of the present invention to provide a system for lubrication of bearings of machines, preferably large machines, which avoids all of the disadvantages mentioned while providing great operational dependability and efficiency.

This object is attained by means of the invention. This is characterized in that the side channel pump is disposed on the same shaft or axle as the bearing, preferably immediately adjoining the bearing, and in that each delivery blade has a cutout at the height of the side channel equivalent to and corresponding with the cross section of the side channel.

This results in the advantage that the lubrication of the bearings can be performed independently of an auxiliary energy source and therefore with extreme operational dependability as well as efficiency. The start and duration of the rotation of the axle or shaft correspond in every case with the operational start and duration of the oil supply for the bearing to be lubricated.

It is furthermore advantageous that the oil feed flow, set into spiral-like motion in the side channel pump, is not interrupted and that in this way interruption-free lubrication is assured.

A further advantage consists in that penetration of cooling water into the oil line system can be quickly recognized because of the simply very short oil pipe lines.

In an embodiment of the invention, the side channel is provided over a portion of the total periphery of the circle of the side channel pump.

This is advantageous because it is possible to adapt the oil pressure exactly to the prevailing operational requirement by an appropriate design of the length of the side channel, i.e., the rotational speed of the side channel pump is invariably set by the shaft or axle on which the side channel pump has been placed.

In a particular improvement of the invention, the length of the side channel can be adjusted by means of exchangeable inserts in the form of segments of a circle.

In this way it is possible to adapt the control of the oil pressure in machines, the operational conditions of which are greatly changed from time to time, to the prevailing operational conditions without having to replace the side channel pump.

An additional characteristic of the invention consists in that the oil line system is run through a cooler and/or a filter or a cooling and filtering unit.

Further increase in the operational dependability is achieved by appropriate filtering and cooling of the oil, because this assures cooling of the bearing. The efficiency of the system according to the invention is further increased in this way.

BRIEF DESCRIPTION OF THE DRAWING

The invention will now be explained in detail by means of an exemplary embodiment with respect to the annexed drawing.

The single drawing figure shows in a sectional view the seating of a shaft end in a bearing, which is to be lubricated, as well as the associated side channel pump.

DETAILED DESCRIPTION OF THE PREFERRED EMBODIMENT

Figure 1:
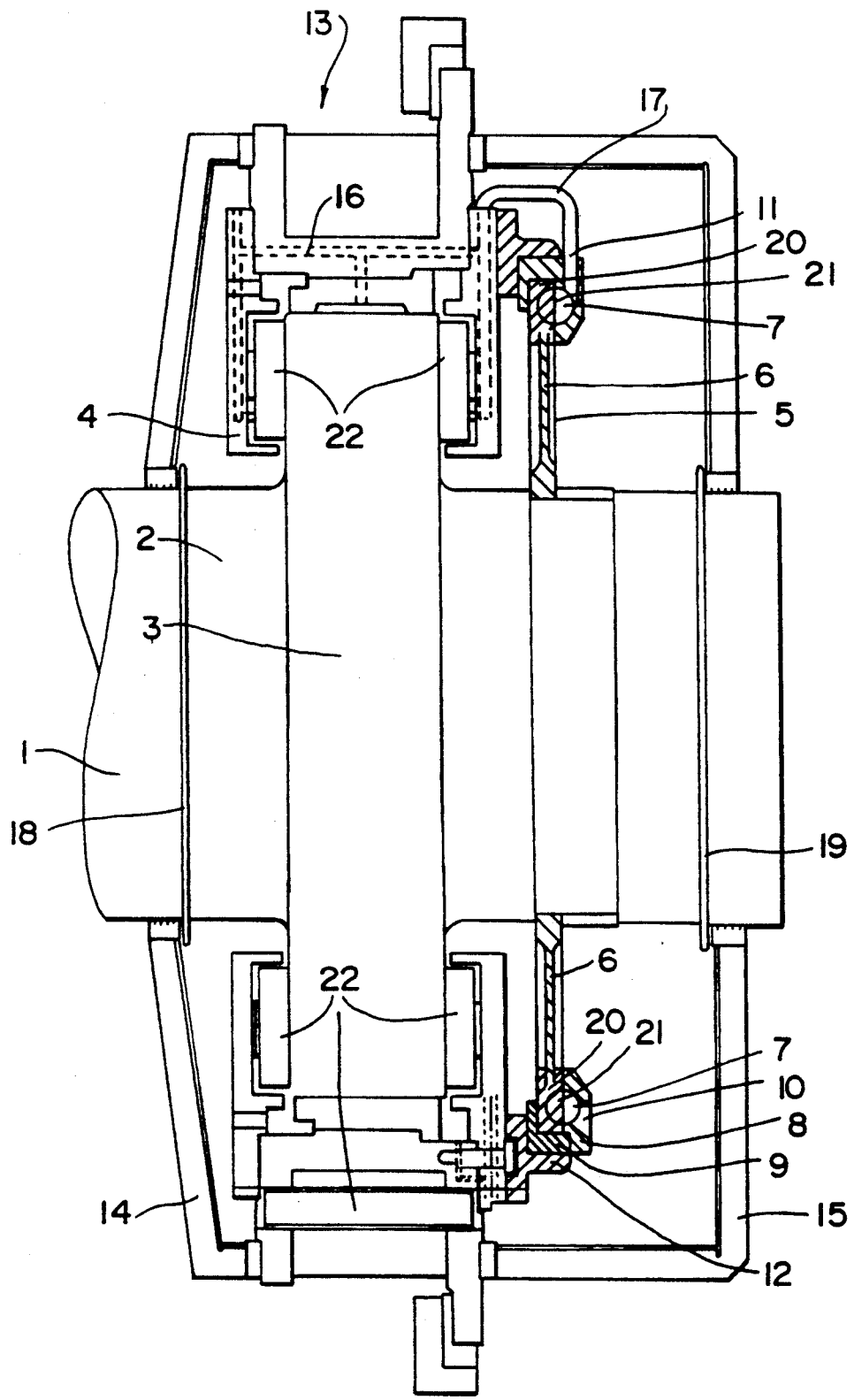

The shaft end 2 of a shaft 1 is provided with a shaft collar 3 for receiving radial and axial forces, which is surrounded by a combination friction bearing 4.

A side channel pump 5, on the impeller 6 of which special conveyor blades 20 have been mounted, is disposed on the same shaft end 2 immediately adjacent the combination friction bearing 4. A side channel 7 is constructed with a semi-circular cross section. The conveyor blades 20 are provided with a semi-circular cutout 21 at the height of the side channel 7, which is equivalent to and corresponds with the cross section of the side channel.

Two seal rings 8, 9 have been provided to prevent the leakage of oil from and the penetration of contaminants into the side channel pump 5. An oil inlet opening 10 is disposed in the lower portion of the side channel 7, an oil outlet opening 11 in the upper portion. The side channel pump 5 is bolted to the combination friction bearing 4 by means of a fastening ring 12. The combination friction bearing 4 and the side channel pump 5 are enclosed by support bodies 14, 15 of a two-part bearing housing 13. Oil channels 16 leading to the segment 22 of the combination friction bearing 4 are connected with the oil outlet opening 11 of the side channel pump 5 by means of an oil pressure line 17. Two splash rings 18, 19, which prevent the escape of oil from the combination friction bearing 4, are mounted in each one of two grooves at the shaft end 2.

Prior to the first start, the combination friction bearing 4 must be filled with sufficient oil so that the level of oil is located approximately in the center between the outer diameters of the shaft 1 and the lower portion of the side channel 7. When the impeller 6 turns, the body of oil present between the blades and the housing wall is pushed by the radially extending conveyor blades 20 towards the outside because of centrifugal force, on the one hand, and on the other hand is forced into the side channel and, in this way, is moved out of the suction chamber of the side channel pump 5 into its pressure chamber. Pressure is built up because of the transfer of the oil from the rotating part of the side channel pump 5 into the side channel 7 or from the side channel 7 into the rotating part. In the course of this, a spiral-like movement is imparted to the oil being moved in the side channel 7. It exits at the upper end of the side channel 7 through the oil outlet opening 11 and flows through the oil pressure line 17 into the oil channels 16 of the combination friction bearing 4. The oil channels 16 terminate at the tracks of the combination friction bearing 4 and, in this way, guide the oil directly on the tracks of the combination friction bearing.

Because the oil is flung out by the conveyor blades 20, underpressure is created around the impeller shaft, i.e., in the present case this is that part of the shaft end 2 on which the impeller 6 has been seated, as well as at the oil inlet opening 10 which causes the continued flow of oil from an oil suction line connected to a cooler or a filter or a cooling and filtering unit. By an appropriate layout of the length of the side channel 7, a proven dimension is, for example, 270° of the total circular circumference of the side channel pump 5, the control of the oil lubricating system is optimized for the respective type of bearing being used. When using a cooler or a cooling and filtering unit, cooling of the bearing is provided in addition to lubrication.

I claim:
1. An arrangement having an automatic delivery device for lubricating a bearing of a shaft, said arrangement comprising:
   a side channel through which lubricating oil flows, said side channel having a predetermined cross section;
   an oil inlet opening in said side channel;
   an oil outlet opening in said side channel; and
   a side channel pump having delivery blades, wherein:

said side channel pump is positioned on the same shaft as the bearing to be lubricated; and each of said delivery blades has a cutout at said side channel equivalent to and corresponding with said predetermined cross section of said side channel.

2. An arrangement in accordance with claim 1, wherein:

said side channel pump has a circular periphery; and said side channel is provided over a portion of said circular periphery.

3. An arrangement in accordance with claim 2, wherein:

said portion of said circular periphery for which said side channel is provided is substantially 270°.

4. An arrangement in accordance with claim 2, wherein:

said side channel comprises exchangeable inserts in the form of segments of a circle for providing length adjustability for said side channel.

5. An arrangement in accordance with claim 1, further comprising:

an oil cooler in fluid communication with said side channel pump.

6. An arrangement in accordance with claim 1, further comprising:

an oil filter in fluid communication with said side channel pump.

7. An arrangement in accordance with claim 1, further comprising:

an oil cooler and an oil filter in fluid communication with said side channel pump.

8. An arrangement in accordance with claim 1, wherein:

said side channel pump is positioned for immediate adjoining relationship with the bearing.

9. An arrangement in accordance with claim 1, wherein:

said delivery blades of said side channel pump are planar.

10. An apparatus comprising:

a bearing for a shaft; and an arrangement for lubricating said bearing, said arrangement comprising:

a side channel through which lubricating oil flows, said side channel having a predetermined cross section;

an oil inlet opening in said side channel;

an oil opening in said side channel; and a side channel pump having radially extending delivery blades, wherein:

said side channel pump is positioned on the same shaft as the bearing to be lubricated; and each of said delivery blades has a cutout at said side channel equivalent to and corresponding with said predetermined cross section of said side channel.

* * * * *